United States Patent [19]

Brackman

[11] 4,043,002
[45] Aug. 23, 1977

[54] PATTY MACHINE AND METHOD OF FORMING PATTIES

[75] Inventor: Donald A. Brackman, Dayton, Ohio

[73] Assignee: Hobart Corporation, Troy, Ohio

[21] Appl. No.: 592,530

[22] Filed: July 2, 1975

[51] Int. Cl.² .......................................... A22C 11/08
[52] U.S. Cl. .................................... 17/32; 17/40; 425/204
[58] Field of Search .............. 17/32, 40, 45; 425/204; 426/512, 513; 100/145, 146

[56] References Cited

U.S. PATENT DOCUMENTS

| | | | |
|---|---|---|---|
| 2,038,247 | 4/1936 | Stallman | 17/40 |
| 2,820,247 | 1/1958 | Michaud | 17/32 |
| 2,889,574 | 6/1959 | Thielen et al. | 17/40 |
| 3,731,345 | 5/1973 | Brackman | 17/32 |

FOREIGN PATENT DOCUMENTS

| | | | |
|---|---|---|---|
| 1,532,031 | 8/1973 | Germany | 17/40 |
| 1,900,567 | 8/1970 | Germany | 17/40 |
| 629,109 | 9/1949 | United Kingdom | 425/204 |
| 136,644 | 5/1960 | U.S.S.R. | 17/40 |

Primary Examiner—Louis G. Mancene
Assistant Examiner—Paul J. Hirsch
Attorney, Agent, or Firm—Biebel, French & Nauman

[57] ABSTRACT

A patty machine for forming successive patties of a predetermined size from a quantity of a bulk product, such as ground meat. The machine includes a charging chamber in which the product is pressure-fed into a patty mold cavity by means of intermeshing, positive displacement, self-wiping compressor screws. The product is delivered from a feed hopper to the entrance of the charging chamber by means of intermeshing, self-wiping conveyor screws which operate on a demand basis to convey the product to the compressor screws only as needed to thereby avoid unnecessary working or kneading of the product. Shafts for driving and supporting the conveyor and compressor screws extend throughout the length of the machine and each carries one conveyor and one compressor screw. The compressor screws are keyed positively to their respective shafts while only one conveyor screw need be so keyed, the unkeyed conveyor screw or screws being driven through intermeshing relationship with the keyed conveyor screw. By virtue of the self-wiping characteristics of both the conveyor and compressor screws, fat accumulations along the screws, which are often a problem in working with ground meat and similar products, are prevented, thereby avoiding the problem of fatty accumulations breaking off as large clots and being charged into the patty mold.

17 Claims, 11 Drawing Figures

PATTY MACHINE AND METHOD OF FORMING PATTIES

BACKGROUND OF THE INVENTION

To satisfy the high demand for food products in patty form, particularly hamburgers, machines have been designed for this purpose which are capable of producing such patties on a high volume basis.

Particularly when dealing in high volumes of patties, it is essential that the portions be controlled precisely, since a small variation in patty size will result in an appreciable difference in the amount of product utilized.

Additionally, it is important that the product, which is usually fairly homogeneous when it is deposited in the patty machine, remain this way during the patty forming operation without undue segregation of specific components of the product. For example, in forming meat patties, there is often a problem with an accumulation or build up of fatty components of the ground meat along surfaces of the patty machine.

Build ups of this type will eventually break away as clots of fat and be charged into the patty mold, resulting in a patty of unacceptable quality. Aside from this, the accumulation of fat or the like along components of the patty machine can interfere with the efficient operation of the machine.

In many patty machines the apparatus used for delivering the product to some type of charging device operates on a continuous basis. This has the effect of providing a constant working or kneading of the product which can affect deleteriously the texture and appearance of the finished patties.

It will also be apparent that since the machines are intended to deliver a food product for human consumption, sanitation is a prime consideratiion. Therefore, an efficient patty machine must be susceptible of thorough cleaning without complicated cleaning procedures.

SUMMARY OF THE INVENTION

The present invention provides a method and apparatus for forming successive, controlled portions of a product in patty form from a quantity of the product in bulk form.

The apparatus includes a charging chamber having an entrance and an exit with the latter communicable with a reciprocating patty mold. Mounted within the charging chamber are intermeshing, self-wiping compressor screws which feed the product by positive displacement under pressure into the patty mold when it is in communication with the chamber exit.

The compressor screws are undercut along the leading faces of their threads to capture the product as it is picked up by the compressor screws and carry it forward without significant radially outward movement of the product as it is forced under pressure out of the charging chamber exit into the patty mold.

Preferably the charging chamber is formed as a one-piece casing, thus simultaneously avoiding the problem of leaks of the pressurized product from the chamber and also facilitating removal of the chamber for clean-up purposes.

By virtue of the self-wiping character of the compressor screws significant accumulations of components of the product, such as fat in ground meat, are avoided and consequently, the problem of large clots of fat being accidentally charged into the patty mold.

It has been found that for best results the upstream ends of the compressor screws should extend out of the charging chamber and into the hopper into which the product is deposited in bulk form. With this configuration it is believed that the upstream ends of the compressor screws, in effect, "capture" a quantity of the product and carry it into the compressor chamber. To assist in this "capturing" of the product by the compressor screws, a baffle is preferably installed in the hopper projecting over the upstream ends of the compressor screws at the entrance of the charging chamber.

Conveyor screws carry the product to the compressor screws and the conveyor screws are also self-wiping to prevent fat accumulation along the faces of the threads thereof. The conveyor screws operate only as needed to supply the compressor screws charging the patty mold, or in other words, on a demand basis, to avoid unnecessary working or kneading of the product.

The compressor screws are single flight screws keyed to and driven directly by shafts extending the length of the machine. Since the compressor screws are of the single flight type and intermeshed they must by necessity be mounted for counter rotation. The conveyor screws on the other hand are preferably multiple flight screws, such as double flight screws, with no appreciable external thread and since they are also intermeshed they must rotate in the same direction.

By keying both compressor screws to the shafts while keying only one of the conveyor screws to a shaft and allowing the opposing conveyor screw or screws to be driven through intermeshing contact, both the conveyor and compressor screws can be mounted on common shafts which can be driven from one end of the patty machine.

Of course, while a pair of compressor screws and a pair of conveyor screws are referred to above, it will be apparent that more than two of each such screws may be used in accordance with the present invention.

From the above and the following detailed description it will be seen that the present invention provides an improved method and apparatus for producing successive controlled portions of a product in patty form of uniform quality, texture and quantity on a high volume basis.

BRIEF DESCRIPTION OF THE DRAWINGS

FIG. 6 is an exploded perspective view of the product handling portion of the machine;

FIG. 7 is a cross-sectional view taken substantially along line 7—7 of FIG. 4, but showing both conveyor screws;

FIG. 8 is an end view of the compressor screws taken along line 8—8 of FIG. 4;

FIG. 9 is a cross-sectional view generally along line 9—9 of FIG. 4 through a conveyor screw and a portion

3 of a second conveyor screw meshing therewith and illustrating a modification thereof;

DESCRIPTION OF THE PREFERRED EMBODIMENTS

With reference to FIGS. 1 and 3 through 5 of the drawings, it will be seen that a patty machine 10 in accordance with the present invention includes a feed hopper 12 and a charging chamber 14 (see particularly FIGS. 4 and 5) communicating with the hopper 12 at an entrance 16 to the charging chamber. The charging chamber 14 is also communicable with a cavity 18 in a reciprocating mold plate 20 through an exit 22 in the downstream end of the charging chamber.

Figure 4:
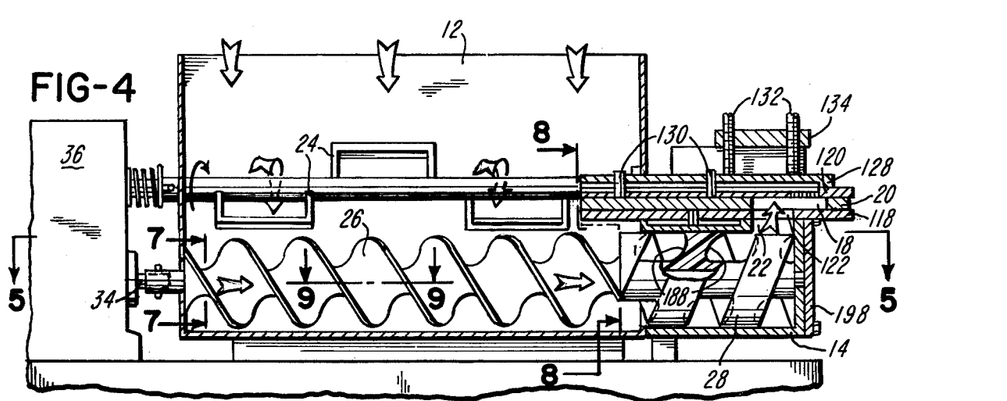
FIG. 4 is a view taken generally along line 4—4 of FIG. 3.

With this general arrangement it will be seen that a food product, such as ground meat, may be deposited in the feed hopper 12 where a paddle assembly 24 prevents the accumulation of the product along the side walls of the feed hopper and conveyor screws 26 and 27, rotating in the same direction, carry the product forward in the direction indicated by the arrows in FIG. 4 of the drawings to the entrance 16 of the charging chamber 14.

A quantity of the product is picked up adjacent the entrance of the charging chamber by compressor screws 28 and 29 and pumped to the exit 22 from the charging chamber so that when the cavity 18 of the reciprocating mold plate 20 is in communication with the exit 22 the cavity is charged under pressure with a quantity of the product sufficient to fill the cavity 18.

It will be noted that both the compressor and conveyor screws are carried on common shafts 30 and 31 which are keyed, as at 32, to drive shafts 34 and 35 projecting from the housing 36. Shafts 30 and 31 are rotatably mounted at their opposite ends 38 in openings 40 formed in the downstream end of the charging chamber 14.

Figure 1:
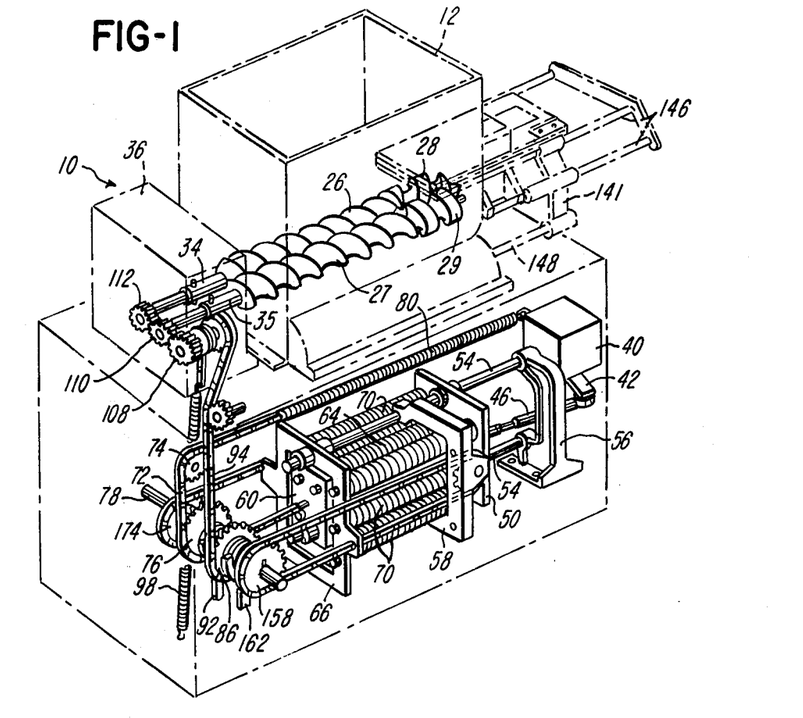
FIG. 1 is a perspective view, with parts in phantom, showing the general arrangement of certain components of the machine of the present invention.
Figure 10:
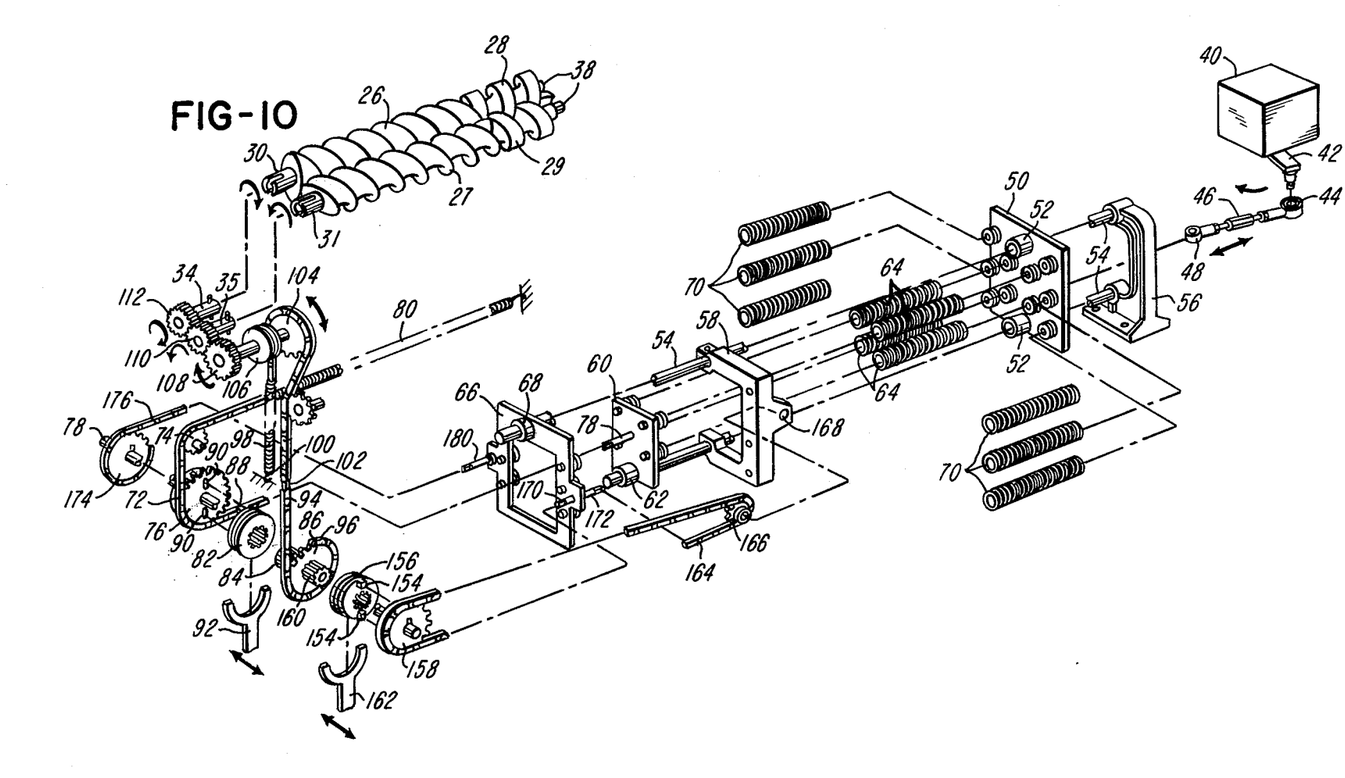
FIG. 10 is an exploded perspective view of the compressor and conveyor screws and the drive mechanism therefor.
Figure 11:
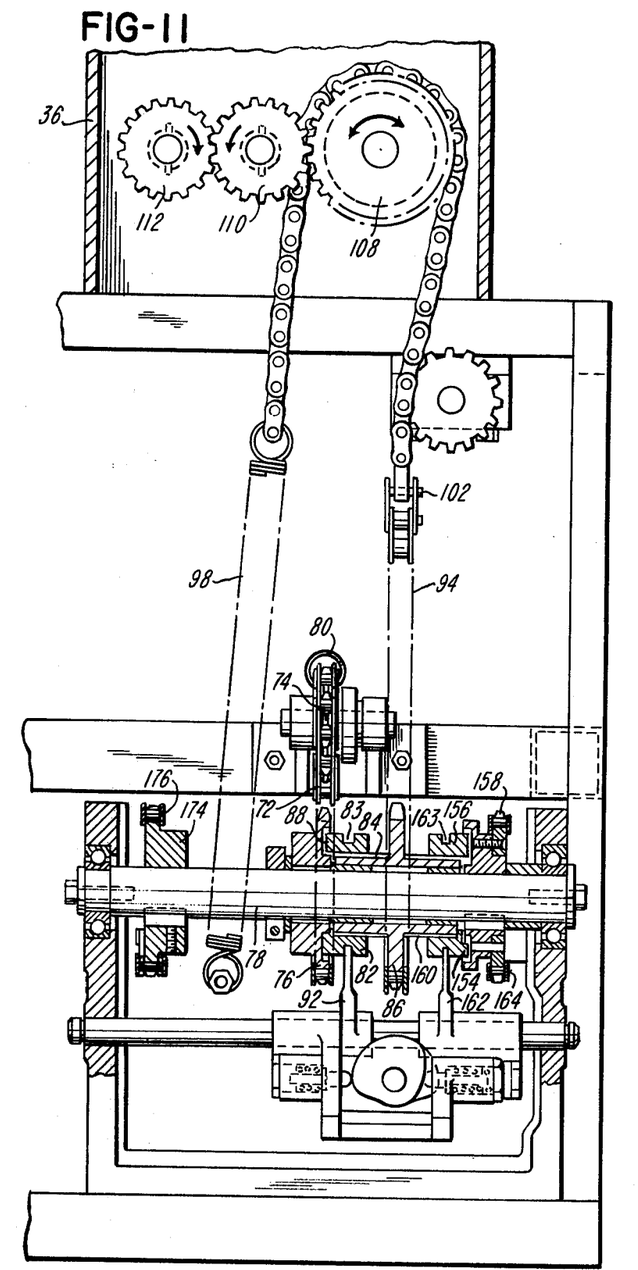
FIG. 11 is an end view with parts in section showing a portion of the drive mechanism.

With reference to FIGS. 1, 10, and 11 of the drawings it will be seen that a motor 40 is mounted within the framework of the patty machine and has projecting therefrom a drive shaft (not shown) to which is rigidly fixed a crank arm 42. Journalled, as at 44, on an outer end of the arm 42 is an adjustable drive rod 46 which is also journalled at its opposite end 48 to a plate member 50.

Plate member 50 is provided with bushings 52 slidably receiving fixed guide rods 54 carried by brackets 56 and 58. An inner spring plate 60 is provided with a bushing 62 slidable on the lower guide rod 54 and has connected thereto a plurality of springs 64, four being shown for purposes of illustration, with the springs being connected at their opposite ends to the plate 50.

An outer spring plate 66 is provided with a bushing 68 slidably receiving the upper guide rod 54 and carrying a plurality of springs 70, six being shown for purposes of illustration, which are attached at their opposite ends to the plate 50.

With the above construction it will be seen that rotation of the crank arm 42 in the direction indicated by the arrow in FIG. 10 of the drawings will cause reciprocating movement of the drive rod 46 in the direction indicated by the double headed arrow. Reciprocating motion of the drive rod 46 is transferred to the drive plate 50 causing it to reciprocate back and forth on the upper and lower guide rods 54.

As long as there is no restraining force resisting movement of the spring plates 60 and 68 toward the motor 40, the tension of the springs 64 and 70 will be sufficient to cause the plates 60 and 66 to reciprocate back and forth in unison with the plate 50. However, if a force tends to restrain movement of the plate 68 in a direction toward the motor 40 the springs 70 will elongate. Similarly if a restraining force is exerted against movement of spring plate 60 toward the motor 40, the springs 64 will elongate.

Referring now to the left hand side of FIG. 10 and FIGS. 1 and 11, it will be seen that a chain 72 is trained about an idler sprocket 74 and a second sprocket 76 mounted for rotation on the shaft 78. One end of the chain 72 is fixed to the spring plate 60, as at 78, and the opposite end of the chain is attached to a spring 80, anchored to any convenient portion of the machine, such as on the motor 40, as seen in FIG. 1 of the drawings.

An internally splined member 82 is slidably received on the splined hub 84 attached to a toothed sprocket 86. A face of the member 82 adjacent the sprocket 76 is provided with keys, one of which is shown at 88, engageable with complementary sockets 90 formed in the face of the sprocket 76. The periphery of the member 82 is grooved at 83 to receive a fork-like switching device 92 mounted, as seen in FIG. 11, for movement in the directions indicated by the double headed arrows in FIGS. 10 and 11.

With this construction it will be seen that with the member 82 shifted toward the sprocket 86, the keys 88 will be out of engagement with the sockets 90, so that movement of the sprocket 76 around the shaft 78 due to reciprocating motion of the spring plate 60 will result in no rotational movement of the sprocket 86. However, if the member 82 is shifted by means of the member 92 so that the keys 88 are received in the sockets 90, rotation of the sprocket 76 will result in rotation of the sprocket 86.

Wrapping a portion of the sprocket 86 is a chain 94 which is anchored, as at 96, to the sprocket 86 and at its opposite end to a spring 98, the latter being anchored to any suitable portion of the machine as shown diagrammatically in FIG. 10 of the drawings. It will also be noted from FIGS. 10 and 11 that the chain 94 is rotated 90° at the point 102 to permit it to wrap a sprocket 104 whose axis of rotation is at 90° to the axis of rotation of the sprocket 86.

Sprocket 104 is connected through a one-way clutch 106 to a toothed gear 108 which meshes with a toothed gear 110 fixed to the drive shafts 35, and the toothed gear 110 in turn meshes with a second toothed gear 112 fixed to the other of the drive shafts 34.

With this construction and with the member 82 interconnecting sprockets 76 and 86, it will be seen that movement of the spring plate 60 toward the motor 40 will result in rotation of the sprocket 104 in a clockwise direction as seen in FIG. 10 of the drawings.

This rotational movement is transferred through the one-way clutch 106 to the gear 108, which in turn results in counter-clockwise rotation of gear 110 and clockwise movement of gear 112. Since the shafts 30 and 31 are keyed to the drive shafts 34 and 35, shafts 30 and 31 will be rotated in opposite directions, as indicated by the arrows in FIG. 10 of the drawings.

Figures 6, 7, 8, 9:
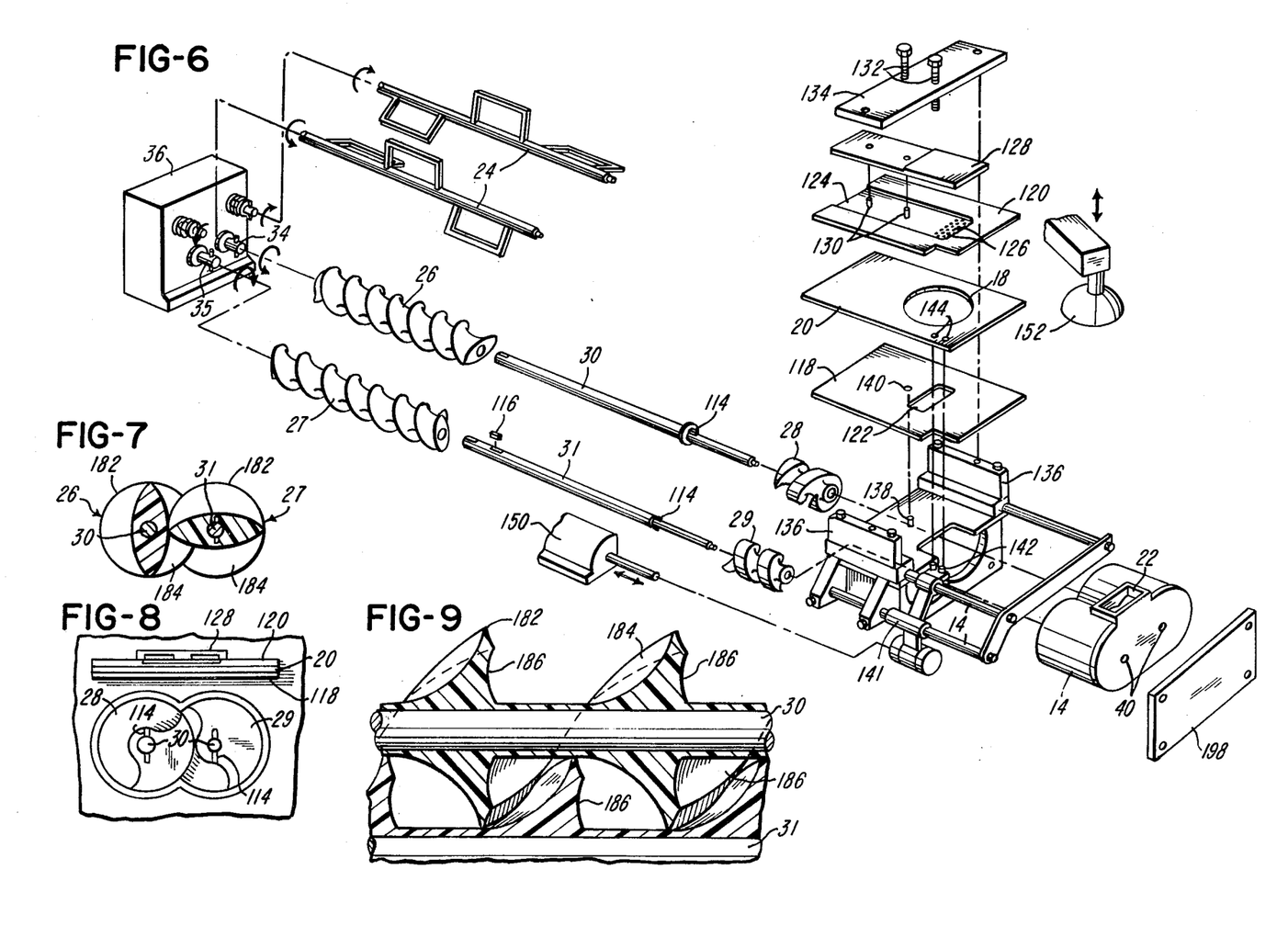

As best seen in FIG. 6 of the drawings, the compressor screws 28 and 29 are keyed to the shafts 30 and 31 by keys 114 received in complementary keyways in the compressor screws (see also FIG. 8 of the drawings). Thus, the single flight, intermeshing compressor screws 28 and 29 are driven positively in opposite directions to carry the product into the compression chamber 14 and out the exit 22 therefrom.

The conveyor screws 26 and 27 are also carried by the shafts 30 and 31. However, conveyor screw 26 is mounted for rotation about the shaft 30 while conveyor screw 27 is keyed to the shaft 31 by means of the key 116. Therefore, the rotational movement of drive shaft 35 is transmitted directly to conveyor screw 27 through the shaft 31 but drive shaft 34 merely rotates within the conveyor screw 26. However, since the conveyor screws 26 and 27 are intermeshing, double flight screws, rotation of the screw 27 causes rotation in the same direction of the screw 26.

With this configuration it will be seen that reciprocating movement of the plate 50 will be transmitted through the springs 64, spring plate 60, the sprockets 76, 86 and 104, one-way clutch 106, and gears 108, 110 and 112 to rotate conveyor screws 26 and 27 in a counter-clockwise diretion as seen in FIG. 10, and compressor screws 28 and 29 in clockwise and counter-clockwise directions, respectively.

As the product being portioned into patties tends to restrain rotational movement of the screws, as, for example, when cavity 18 is out of communication with the charging chamber, the springs 64 will tend to elongate. Additionally, if voids occur in the product while it is in the charging chamber, the springs can compensate for such voids to insure that the mold cavity 18 is filled each time it is in communication with the charging chamber.

In this regard, and with reference to FIGS. 4 and 6 of the drawings, it will be seen that the mold plate 20 in which the cavity 18 is formed slides between lower and upper shear plates 118 and 120 with an opening 122 in the lower shear plate in registration with the exit 22 from the charging chamber. The upper shear plate 20 is provided with a scrap return channel 124 having a perforated section 126 disposed above the opening 122 and a plate 128 fits over the scrap return channel and is attached to the plate 120 by means of pins 130 received in corresponding openings in the plate 128.

In this way, air in the empty mold cavity is exhausted through the openings 126 and channel 124 as the product is packed under pressure into the cavity 18. The channel 124, as best seen in FIG. 4 of the drawings, extends back into the hopper so that any of the product which is forced through the openings 126 is returned to the hopper 12.

The entire assembly of mold plate and shear plates is secured to a forward portion of the machine by means of pressure screws 132 threaded into a cross plate 134 fixed to the side members 136. Forward and rearward movement of the plate 118 is prevented by means of the pin 138 received in an opening 140 in the plate. The plate 20 is attached to a bracket 141 by means of pins 142 received in openings 144 in the mold plate and the bracket 141 is carried by slide rods 146. The bracket 141 is attached to one end of a drive rod 148, with the latter mounted in a housing 150 for reciprocating movement in any convenient manner.

Figure 3:
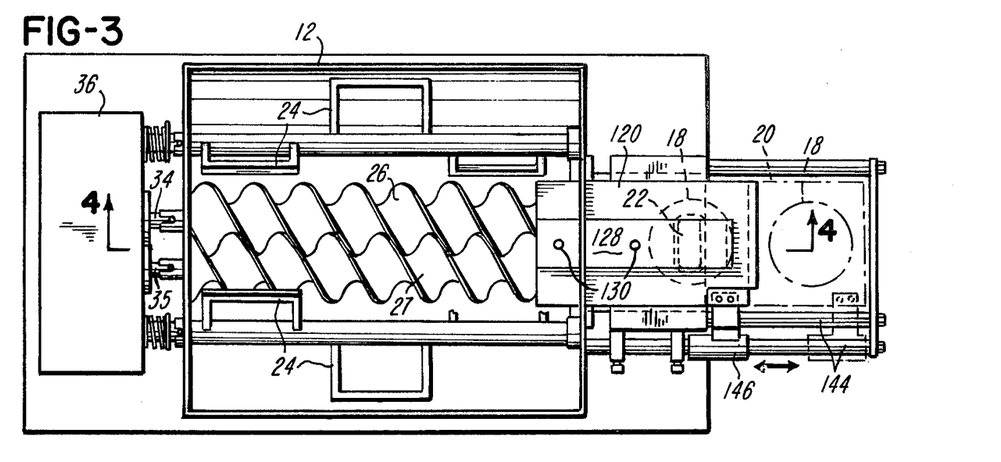
FIG. 3 is a top plan view of the patty machine of the present invention.

Of course as the mold plate 20 reaches the position shown in dotted lines in FIG. 3 of the drawings, the knockout device 152, which may be cam operated and driven off the motor 40, knocks out a formed patty onto a conveyor or other receiver positioned to move the formed patties.

Should the product being formed into patties be of somewhat stiffer mixture than that contemplated in the description above, it may be necessary to transmit greater rotational force to the screws 26, 27, 28 and 29. This can be accomplished by disengaging the keys of member 82 from the sockets 90 of the sprocket 76 and engaging keys 154 of a member 156 with complementary sockets, not shown, in a sprocket 158. Member 156 is internally splined to receive the external splines 160 on sprocket 86 and shifting movement of the member 156 can be accomplished by the shifting member 162 received in a groove 163 in the member 156 and mounted for movement in the direction of the double headed arrows by a cam device or the like as seen in FIG. 11.

With this construction and with the machine in this configuration, it will be seen that reciprocating movement of the plate 50 is transmitted through the six springs 70 to the outer spring plate 66. A chain 164 is trained about a sprocket 166 mounted for rotation on the bracket 158, as indicated at 168, and about the sprocket 158. The chain is anchored at one end 170 to the rear face of the plate 66 and at its opposite end 172 to the forward face of the plate 66.

Therefore, reciprocating movement of the plate 66 is transmitted through the chain 164, the sprocket 158, member 156, sprockets 86 and 104, one-way clutch 106 and the gears 108, 110 and 112 to the conveyor and compressor screws 26, 27, 28 and 29. Assuming that the springs 70 are of the same strength as the springs 64 it will be apparent that a greater force must be imposed to restrain rotation of the screws and cause elongation of the six springs 70 than with the four springs 64.

To provide a balanced construction it will be noted from FIG. 10 of the drawings that the sprocket 158 is fixed to the shaft 78 and that the opposite end has a sprocket 174 also fixed thereto. A chain 176 wraps the sprocket 174 and is anchored thereto as at 178 and the opposite end of the chain 176 is attached, as at 180, to the forward face of the outer spring plate 66.

Of course, if an especially stiff material is being worked, it is possible to engage both sprockets 76 and 158 with the sprocket 86, thereby requiring a force necessary to overcome the tension of all ten springs 64 and 70 before rotation of the screws is terminated.

Figure 5:
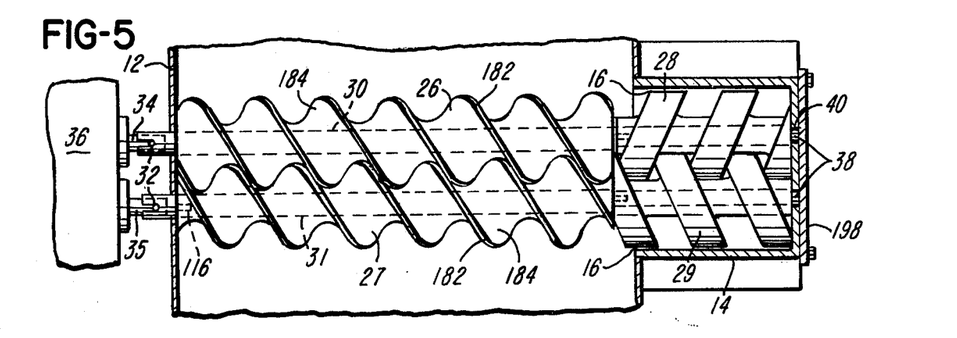
FIG. 5 is a view taken generally along line 5—5 of FIG. 4 and showing the coaxial mounting of the compressor and conveyor screws.

As best seen in FIGS. 3, 5 and 7 of the drawings, the double flight conveyor screws 26 and 27 are formed with crest portions 182 defined by the faces 184 of the screw threads. The faces 184 slope away sharply from the crest 182 and thereby facilitate entrance of the product to the screws and prevent an accumulation of the product on the crests, as might be the case if screws of the type used for compressor screws 28 and 29 were utilized.

Additionally, it will be seen that the crest portions 182 of the conveyor screws are in wiping contact with the face portions 184, providing a continuous, self-wiping of one screw by the other as they are rotated in the same direction.

Where the self-wiping feature is not required to the extent that it might be in certain operations, and/or where a more positive conveying of the product forward is desired, the conveyor screws 26 and 27 may be provided with undercut portions 186 along their forward faces, as best seen in FIG. 9 of the drawings.

Of course if desired, one or both of the conveyor screws can be formed with undercut portions and the conveyor screws reversed on their shafts 30 and 31, allowing the undercut portion or portions of the screws to face forwardly or rearwardly if desired. If facing rearwardly the undercut portions would have little or no effect, but they would be available by simply reversing the screws.

The compressor screws are intended to receive the product conveyed to them by the conveyor screws and pressure feed the product through the exit 22 in the charging chamber into the mold cavity 18. The compressor screws are formed as single flight screws intermeshing and therefore rotating in opposite directions. As can be best seen in FIG. 4 of the drawings, the compressor screws are undercut at 188 to substantially eliminate radially outward movement of the product as they carry it forward under pressure to the mold cavity 18.

Preferably the rearward ends of the compressor screws project from the charging chamber 14 back into the hopper 12 to allow them to bite into and capture a portion of the product and convey it into the charging chamber.

Figure 2:
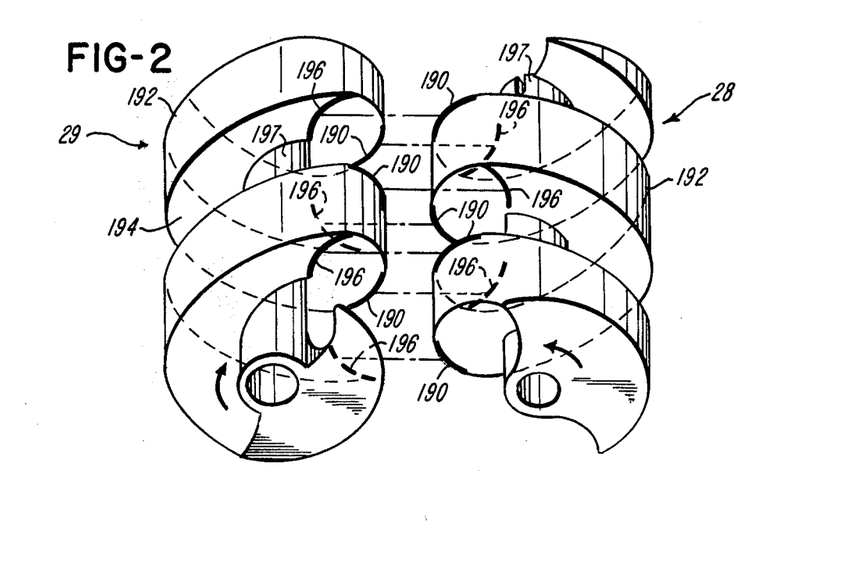
FIG. 2 is an exploded perspective view of a pair of intermeshing compressor screws illustrating diagrammatically the self-wiping character of the screws.

The compressor screws, similarly to the conveyor screws, are designed for self-wiping. The self-wiping action is attained, as best seen in FIG. 2 of the drawings, by the edge portions 190 along the outer circumferences 192 of the screws being in wiping contact with the face portions 194 thereof along lines 196 extending outwardly from adjacent the inner diameters 197 of the screws to the outer circumferences 192 thereof, and by the inner diameters 197 and outer circumferences 192 being in wiping contact.

With this construction it will be apparent that at all times edge portions along the circumferences of each of the screws are moving across the thread faces and preventing appreciable build ups of fatty deposits or the like while the outer circumferences and inner diameters of the screws cooperate to prevent build-up along these surfaces.

To facilitate cleaning and prevent leakage from the charging chamber 14, the chamber is preferably constructed as a one-piece, molded section, contoured to receive the compressor screws 28 and 29 and held in place by a plate 198 which may be bolted to a portion of the machine structure beneath the shear and mold plates.

As noted above, the compressor screws preferably project back into the hopper 12 to enhance movement of the product into the charging chamber. As seen in FIGS. 3 and 4, the lower shear plate 118 projects back into the hopper 12 and forms a baffle which prevents flow of the product away from the upstream ends of the compressor screws and thereby assists in insuring that the charging chamber is filled with the product being formed.

In operation, one of the three spring settings is selected, that is, either the four springs 64, the six springs 70 or all ten springs, depending upon the product being formed, the temperature of the product and the size patties to be formed. A quantity of the product is then deposited in the hopper 12 where the conveying screws move the product forward to the compressor screws 28 and 29, with the latter moving the product forward under pressure and forcing it into the mold cavity 18 when the cavity is in communication with the exit 22 of the charging chamber.

The mold plate then moves forward out of communication with exit 22 to the knock-out position, where the knock-out removes the freshly formed patty from the cavity 18. While the cavity 18 is out of communication with the exit 22, the product cannot be forced out of the charging chamber 14 and, assuming there are no voids in the product, the compressor screws will be stopped even though the motor 40 continues to run. During this condition the springs 64 or 70 or both compensate for lack of movement of the compressor screws. Of course if there is a void in the product this void will generally be collapsed by the increased pressure generated when the exit from chamber 14 is closed.

Since the conveyor screws 27 is driven in unison with compressor screw 29 and conveyor screw 26 is driven by conveyor screw 27 there will be no movement of the conveyor screws unless the compressor screws are also moving. Therefore, rather than the conveyor screws moving continuously and kneading and working the product unnecessarily while the compressor screws are stopped, screws 26 and 27 operate only to provide product to the compressor screws as needed, thereby operating on a demand basis and providing improved texture to the patties.

It will also be noted that with this construction, the entire drive for both sets of screws is positioned at one end of the machine, rather than requiring separate drives for the two sets of screws and even though one set rotates in the same direction while the other set rotates in opposite directions.

From the above it will be apparent that the present invention provides a method and apparatus for forming portions of a bulk product into patties of a uniform size and quality and without fat build-up or unnecessary working of the product.

While the method herein described, and the forms of apparatus for carrying this method into effect, constitute preferred embodiments of the invention, it is to be understood that the invention is not limited to this precise method and forms of apparatus, and that changes may be made in either without departing from the scope of the invention.

What is claimed is:

1. In a machine for delivering in patty form controlled portions of a bulk product, including a feed hopper, a patty mold and means for charging said patty mold with said product to provide controlled portions thereof, product conveying means for conveying product from said hopper to said charging means comprising:

a plurality of conveyor screws positioned in said hopper and communicating with said charging means, means mounting said conveyor screws for rotation about longitudinal axes thereof in a direction to convey product to said charging means, each of said conveyor screws consisting of multiple flights of screw threads of substantially uniform size throughout the lengths of said screws, said multiple flights of uniformly sized threads consisting of face portions and crest portions defined substantially by the intersections of said face portions, said conveyor screws being intermeshed throughout their lengths, and said crest portions of said conveyor screws being disposed in wiping relationship to said face portions of said conveyor screws, whereby said conveyor screws are substantially self-wiping throughout their lengths and thereby minimize accumulation along said face portions of said conveyor screws of the product being conveyed thereby or components of said product.

2. The machine of claim 1 wherein:
a. said conveyor screws are mounted for rotation in the same direction.

3. The machine of claim 1 wherein:
a. one of said screws is driven by a drive shaft, and
b. another of said conveyor screws intermeshed therewith is driven by rotation of said shaft driven conveyor screw.

4. The machine of claim 1 wherein:
a. at least one face portion of one of said conveyor screws is undercut.

5. The machine of claim 1 wherein:
a. said conveyor screws are double flight screws.

6. The machine of claim 1 wherein said charging means comprises:
a. a charging chamber having an entrance communicating with said hopper and an exit communicable with said patty mold, and
b. a plurality of compressor screws disposed in said charging chamber and mounted for rotation to move by positive displacement the product from said entrance of said chamber to said exit thereof.

7. The machine of claim 6 further comprising:
a. means for driving said compressor screws in directions and at speeds to completely fill said patty mold when said patty mold is in communication with said exit of said charging chamber.

8. The machine of claim 6 wherein:
a. said compressor screws are intermeshed, and
b. said compressor screws are each positively driven in opposite directions.

9. The machine of claim 8 wherein:
a. said intermeshed compressor screws are in self-wiping relationship to each other.

10. The machine of claim 9 wherein said self-wiping relationship of said compressor screws consists of:
a. edges formed along outer circumferences of said compressor screws in wiping relationship to face portions of opposing, intermeshed screws along lines extending outwardly from adjacent the inner diameters of said compressor screws to the outer circumference thereof.

11. The machine of claim 10 wherein said self-wiping relationship of said compressor screws consists of:
a. said inner diameters and said outer circumferences of intermeshing compressor screws being in wiping relationship with each other.

12. The machine of claim 6 wherein:
a. upstream ends of said compressor screws extend from said entrance of said charging chamber into said hopper.

13. The machine of claim 12 further comprising:
a. a baffle positioned in said hopper over said entrance to said charging chamber.

14. The machine of claim 6 wherein:
a. said charging chamber is formed as a one piece member.

15. The machine of claim 6 wherein:
a. a pair of shafts are provided extending longitudinally of said machine from said hopper into said charging chamber,
b. one of said conveyor screws and one of said compressor screws are mounted on each of said shafts, and
c. said conveyor screws are mounted for rotation in the same direction and said compressor screws are mounted for rotation in opposite directions.

16. The machine of claim 15 further comprising:
a. drive means for driving all of said conveyor and compressor screws simultaneously an amount sufficient to fill said patty mold when said patty mold is in communication with said charging chamber exit.

17. The machine of claim 16 further comprising:
a. drive transmitting means interposed intermediate said drive means and said compressor screws and operative to allow said compressor screws to cease rotating when a predetermined restraining force is applied against rotation of said compressor screws while allowing said drive means to continue to operate.

* * * * *